(12) United States Patent
Matsubayashi et al.

(10) Patent No.: US 9,821,360 B2
(45) Date of Patent: Nov. 21, 2017

(54) APPARATUS AND METHOD FOR MANUFACTURING THIN UNEVEN MEMBER

(71) Applicant: MITSUI HIGH-TEC, INC., Fukuoka-ken (JP)

(72) Inventors: Satoshi Matsubayashi, Kitakyushu (JP); Kiyohisa Maki, Kitakyushu (JP); Toshihiko Ezaki, Kitakyushu (JP); Takeshi Sato, Kitakyushu (JP); Kouji Fukunaga, Kitakyushu (JP)

(73) Assignee: MITSUI HIGH-TEC, INC., Kitakyushu-shi, Fukuoka (JP)

( * ) Notice: Subject to any disclaimer, the term of this patent is extended or adjusted under 35 U.S.C. 154(b) by 144 days.

(21) Appl. No.: 14/602,380

(22) Filed: Jan. 22, 2015

(65) Prior Publication Data
US 2015/0280252 A1    Oct. 1, 2015

(30) Foreign Application Priority Data
Mar. 26, 2014   (JP) .................................. 2014-063414

(51) Int. Cl.
*B21D 17/02* (2006.01)
*B21D 28/26* (2006.01)
(Continued)

(52) U.S. Cl.
CPC ............. *B21D 28/26* (2013.01); *B21D 17/02* (2013.01); *B21D 35/001* (2013.01);
(Continued)

(58) Field of Classification Search
CPC ........ B21D 13/02; B21D 17/02; B21D 22/02; B21D 22/06; B21D 24/005; B21D 28/002;
(Continued)

(56) References Cited

U.S. PATENT DOCUMENTS 3,910,087 A    10/1975   Jones
4,109,503 A *   8/1978   Francon ................. B21D 13/02
                                                            428/183
(Continued)

FOREIGN PATENT DOCUMENTS

CN    1366486 A    8/2002
CN    1774331 A    5/2006
(Continued)

OTHER PUBLICATIONS

Communication dated Dec. 5, 2016, issued by the State Intellectual Property Office of P.R. China in counterpart Chinese application No. 201510036548.6.

*Primary Examiner* — Edward Tolan
(74) *Attorney, Agent, or Firm* — Sughrue Mion, PLLC (57) ABSTRACT

There is provided an apparatus for manufacturing a thin uneven member. The apparatus includes a lower die fixed to a press bed, an upper die fixed to a ram and disposed opposed to the lower die, and a pressure-drive unit which presses the ram using a servo motor as a power source, the servo motor being fixed to a first support member. The pressure-drive unit includes a motion converting mechanism which converts a rotation of the servo motor to a linear motion of a lifting member, and a cylinder block connected and fixed to the first support member and including first and second pistons arranged in series vertically, wherein the first piston is connected to the lifting member through a second support member, and the second piston, larger in diameter than the first piston, presses the ram.

13 Claims, 9 Drawing Sheets

(51) Int. Cl.
  *B21D 35/00* (2006.01)
  *H01M 8/0232* (2016.01)
  *H01M 8/0254* (2016.01)
  *H01M 8/0263* (2016.01)

(52) U.S. Cl.
  CPC ........ *H01M 8/0232* (2013.01); *H01M 8/0254* (2013.01); *H01M 8/0263* (2013.01); *Y02P 70/56* (2015.11)

(58) Field of Classification Search
  CPC ... B21D 28/26; B21D 35/001; H01M 8/0254; H01M 8/026; B30B 15/0052; B30B 15/161; B30B 15/20
  USPC ............... 72/453.02, 453.03, 453.06, 453.07
  See application file for complete search history.

(56) References Cited

U.S. PATENT DOCUMENTS

| | | | |
|---|---|---|---|
| 7,152,444 B2 | 12/2006 | Matsumoto et al. | |
| 7,765,848 B2 | 8/2010 | Nagai et al. | |
| 7,963,141 B2 | 6/2011 | Nagai et al. | |
| 2002/0134256 A1 | 9/2002 | Futamura et al. | |
| 2005/0188740 A1* | 9/2005 | Enjoji | B21D 13/02 72/404 |
| 2005/0241732 A1 | 11/2005 | Ishigami et al. | |
| 2006/0225475 A1 | 10/2006 | Matsumoto et al. | |
| 2007/0240479 A1 | 10/2007 | Nagai et al. | |
| 2010/0275670 A1 | 11/2010 | Nagai et al. | |

FOREIGN PATENT DOCUMENTS

| | | |
|---|---|---|
| CN | 101054003 A | 10/2007 |
| CN | 101301668 A | 11/2008 |
| JP | 10-233220 A | 9/1998 |
| JP | 2005-063889 A | 3/2005 |
| JP | 2012-28047 A | 2/2012 |

\* cited by examiner

APPARATUS AND METHOD FOR MANUFACTURING THIN UNEVEN MEMBER

CROSS REFERENCE TO RELATED APPLICATIONS

The present application is based on the Japanese patent application No. 2013-155762 filed on Jul. 26, 2013 and the Japanese patent application No. 2014-63414 filed on Mar. 26, 2014, the contents of which are incorporated herein by reference in its entirety.

BACKGROUND OF THE INVENTION

1. Field of the Invention

The present invention relates to apparatus and method for manufacturing a thin uneven member for use as a fuel cell separator using a pressure mechanism to be driven by, for example, a servo motor.

2. Description of the Related Art

A solid molecule type fuel cell has been attracting attention as a small energy source for vehicle or home use. The solid molecule type fuel cell includes, as a main part thereof, a separator which supplies reactant gas to an electrode and collects current. Since a general separator is manufactured by hardening graphite and cutting the hardened graphite, it has a problem that the productivity thereof is poor and thus the manufacturing cost thereof is expensive. In use, since a little less than 1,000 sheets of separators are piled up per vehicle or a little less than 100 sheets of separators are piled up for home use, the fuel cell is very expensive as compared with other cells. Thus, for the spread of the fuel cell, the great productivity enhancement and cost reduction of the separators are needed.

Thus, to meet the need for development of a press-workable metal separator, a metal separator made of stainless-system and titanium-system materials has been developed (for example, see JP-A-2012-28047 and JP-A-2005-63889). If such materials can be molded into a separator by press working, the separator can be manufactured at a cost which is one several decades when compared with the graphite-made separator.

Moreover, JP-A-10-233220 discloses a solid polymer type fuel cell in which both surfaces of a metal thin plate are worked by 1-shot pressing to form groove-shaped flow passages to thereby produce the thin plate as a press plate and mask plates each having an opening in its central portion are attached to both surfaces of the press plate to thereby form a separator.

SUMMARY OF THE INVENTION

A press machine for use in such separator forming includes a mechanical type press and a hydraulic type press. The mechanical type press includes a crank press and a servo press, whereas the hydraulic type press includes a servo press. The characteristics of the respective presses are as follows.

(1) Crank Press (Mechanical Type)

Since the plastic deformation of the material of the separator cannot follow the speed of the press, the extension of the material is insufficient and the material is hardened in working, resulting in the poor thickness and breakage of the separator. Also, even when the press is operated at a minimum speed, slight vibrations generated from the press are transmitted to the material, thereby failing to secure the expected dimension and quality of the separator. Thus, generally, in forming work, there is often used a servo press which generates less vibrations than the crank press and is easy to control. However, the servo press has the following problems.

(2) Servo Press (Mechanical Type)

For high thrust (100 t to 6000 t), a large-scale press apparatus is necessary, resulting in the high cost. Thus, a hydraulic type servo press is also used to work the separator.

(3) Servo Press (Hydraulic Type)

Since, by controlling oil pressure flow rate and pressure, the press speed and the positioning of dies can be determined, the press can have a smaller scale and can provide higher thrust than the mechanical type servo press. However, since the press always continues to rotate a hydraulic pump to suck a large quantity of operating oil from a tank to thereby produce the oil pressure, even while an actuator is stopping, it continues to consume 100% of electric energy and further, wastefully consumed energy is converted to heat, thereby increasing the temperature of the operating oil endlessly.

Also, in a hydraulic circuit, when the flow of oil is changed suddenly due to the delayed operation of a relief valve, the operation of a switch valve or the like, the kinetic energy of the fluid is converted to pressure energy to thereby cause sudden variations in the pressure, resulting in the failure of the hydraulic circuit.

A non-limited object of the present invention to provide an apparatus and a method for manufacturing a thin uneven member which can generate high thrust with a force much smaller than in a conventional servo press (hydraulic type) and thus can realize miniaturization, enhanced precision and reduced cost.

A first aspect of the present invention provides an apparatus for manufacturing a thin uneven member, the apparatus including: a lower die fixed to a press bed; an upper die fixed to a ram and disposed opposed to the lower die; and a pressure-drive unit which presses the ram using a servo motor as a power source, the servo motor being fixed to a first support member, wherein the pressure-drive unit includes: a motion converting mechanism which converts a rotation of the servo motor to a linear motion of a lifting member; and a cylinder block connected and fixed to the first support member and including first and second pistons arranged in series vertically, wherein the first piston is connected to the lifting member through a second support member, and the second piston, larger in diameter than the first piston, presses the ram.

The apparatus according to the first aspect may further includes a plurality of guide posts provided in a periphery of the ram, wherein the plurality of guide posts are slidably mounted to the second support member.

The apparatus according to the first aspect may further includes paired first and second transversely-movable slide plates interposed between the second cylinder rod of the second piston and the ram.

The apparatus according to the first aspect may be configured so that the first and second slide plates are horizontally separated in two, and there is provided a positioning stopper on the second cylinder rod of the second piston or on the ram for limiting an advance of the first and second slide plates.

The apparatus according to the first aspect may further includes an air slider provided on the ram on which the first and second slide plates slide.

The apparatus according to the first aspect may be configured so that the upper die includes a stripper plate provided on a lower portion thereof through an elastic member.

A second aspect of the present invention provides a method for manufacturing a thin uneven member by using a servo motor as a drive source, driving a second piston with an increased output of a first piston using Pascal's principle, and pressing a thin plate interposed between upper and lower dies with an aid of a ram lifted and lowered by the second piston, the method including: a first step of driving the servo motor to lower the ram to thereby form a clearance between the ram and a second cylinder rod of the second piston; and a second step of operating the second piston in linking with the first piston to perform unevenness working on the thin plate.

Here, the following configuration may be also used. The servo motor is equipped with an encoder therein, and according to a program stored in a control portion of the encoder, the servo motor moves the ram at a given speed to a given position. Also, since the first and second pistons may only be connected together by oil pressure, chambers (cylinder chambers), where the first and second pistons slide and move, can be disposed separately and can be connected by a pipe.

The method according to the second aspect may be configured so that the second step includes disposing paired first and second slide plates in the clearance between the ram and the second cylinder rod to thereby reduce a lowering time of the second piston.

The method according to the second aspect may be configured so that the first and second pistons are successively disposed in series vertically within a cylinder block.

The method according to the second aspect may be configured so that the thin uneven member is a fuel cell separator, and the second step includes performing unevenness working on the thin plate to thereby form a flow passage groove in the fuel cell separator.

The method according to the second aspect may be configured so that the second step includes performing unevenness working on the thin plate simultaneously with the unevenness working for the flow passage groove to form dummy grooves around the flow passage groove.

The method according to the second aspect may further includes a step of forming a pilot hole using a first die apparatus before the second step, and after the second step, a punching step be performed by a third die apparatus.

The method according to the second aspect may be configured so that a slit is formed around the pilot hole in the pilot hole forming step.

The method according to the second aspect may be configured so that a contour of the thin uneven member is partially punched off to cut the remainders of the contour, thereby punching off the thin uneven member from the third die apparatus.

In the apparatus and method of manufacturing thin uneven member according to the first and second aspects, since the second piston increases an output (exactly, a pressing force) using Pascal's principle, the speed of the second piston is reduced accordingly, thereby enabling to enhance the position precision thereof.

Also, since the second piston is driven using Pascal's principle, even when a servo motor for driving the first piston is small in size, a high output can be obtained.

Thus, the apparatus can be miniaturized and electric energy for operating a hydraulic pump as in the prior art can be eliminated, thereby enabling to reduce the cost greatly.

Especially, in the thin uneven member manufacturing apparatus according to the first aspect, the pressure-drive unit includes the motion converting mechanism for converting the rotation of the servo motor to the linear motion of the lifting member, and the fixedly arranged cylinder block having first and second pistons arranged in series vertically, the first piston being connectable to the lifting member through the second support member and the second piston having a larger diameter than the first piston for pressing the ram. Thus, the apparatus itself can be miniaturized and when the diameter ratio of the first and second pistons is increased, a small-sized servo motor can be used, thereby enabling to miniaturize the apparatus further.

In the thin uneven member manufacturing apparatus according to the first aspect, the plurality of guide posts are provided in the periphery of the ram, and when the guide posts are slidable relative to the second support member, the ram can surely move vertically while maintaining its horizontal state.

In the thin uneven member manufacturing apparatus according to the first aspect, when there are provided paired first and second slide plates transversely movable between the ram and the second cylinder rod of the second piston, the time for operating the ram by the second piston can be reduced, thereby enhancing operation efficiency.

In the thin uneven member manufacturing apparatus according to the first aspect, when the first and second slide plates are horizontally separate in two, and a positioning stopper is provided on the second cylinder rod of the second piston or on the ram for limiting the advancement of the first and second slide plates, the first and second slide plates can be prevented against over-run and can be disposed at specific positions. Especially, when an air slider is provided in the ram on which the first and second slide plates slide, their first and second sliding movements can be smoothed.

In the thin uneven member manufacturing apparatus according to the first aspect (similarly in the second aspect), when stripper plates are provided on the upper and lower dies through elastic members, the thin plate can be worked while it is supported by the lower die and also, since an elastic force is continuously applied to the thin plate even while the upper die is rising, the poor working of the thin uneven member by the rising upper die can be prevented.

Further, since the second piston is larger in diameter than the first piston, surface pressure applied to the upper surface of the ram placed on the upper die can be dispersed by Pascal's principle, whereby the surface pressure can be further equalized.

Here, the pressing force of the upper die can be measured by an oil pressure gage of the cylinder block where the first and second pistons are provided, or a load cell provided separately on the first cylinder rod and thus, in combination with the servo motor, the press can be controlled accurately.

The thin uneven member manufacturing method according to the second aspect includes the first step of driving the servo motor to lower the ram to thereby produce a clearance between the ram and the second cylinder rod of the second piston, and the second step of operating the second piston in linking with the first piston to apply a load to the ram to thereby work the thin plate unevenly. Thus, the press can be controlled accurately and the apparatus can be simplified.

Also, in the thin uneven member manufacturing method according to the second aspect, in the second step, when paired first and second slide plates are provided in the clearance between the ram and second cylinder rod, the lowering time of the second piston can be reduced.

In the thin uneven member manufacturing method according to the second aspect, when the first and second pistons are arranged in series vertically within one cylinder block, the apparatus can be miniaturized, and due to no use of a pipe or the like, its operation is also more accurate.

In the thin uneven member manufacturing method according to the second aspect, when the thin uneven member is a fuel cell separator, and in the second step, by unevenness working to be performed on a thin plate, a flow passage groove is formed in the fuel cell separator, the main portions of the separator can be pressed in a short time.

In the thin uneven member manufacturing method according to the second aspect, when, in the second step, simultaneously with the unevenness working of the flow passage groove, dummy grooves to be formed in the periphery of the flow passage groove are also worked unevenly, multiple portions can be worked unevenly in one step, thereby enabling to enhance productivity.

In the thin uneven member manufacturing method according to the second aspect, when the method includes a pilot hole forming step of forming pilot holes by the first die apparatus before the second step, and after the second step, a punching step to be performed by the third die apparatus, the respective die apparatuses can be operated in top condition, thereby enabling to enhance production efficiency.

In the thin uneven member manufacturing method according to the second aspect, when, in the pilot hole forming step, a process for forming slits in the periphery of the pilot holes is also executed, it is possible to prevent the deformation and position displacement of the pilot holes caused by press working to be performed thereafter.

In the thin uneven member manufacturing method according to the second aspect, when the contour of the thin uneven member is partially punched off to cut the remaining portions of the contour, and the thin uneven member is then punched down from the third die apparatus, pressing can be performed with reduced load.

DETAILED DESCRIPTION OF THE EXEMPLARY EMBODIMENTS

Next, description is given of an embodiment of the present invention with reference to the accompanying drawings.

Figure 1:
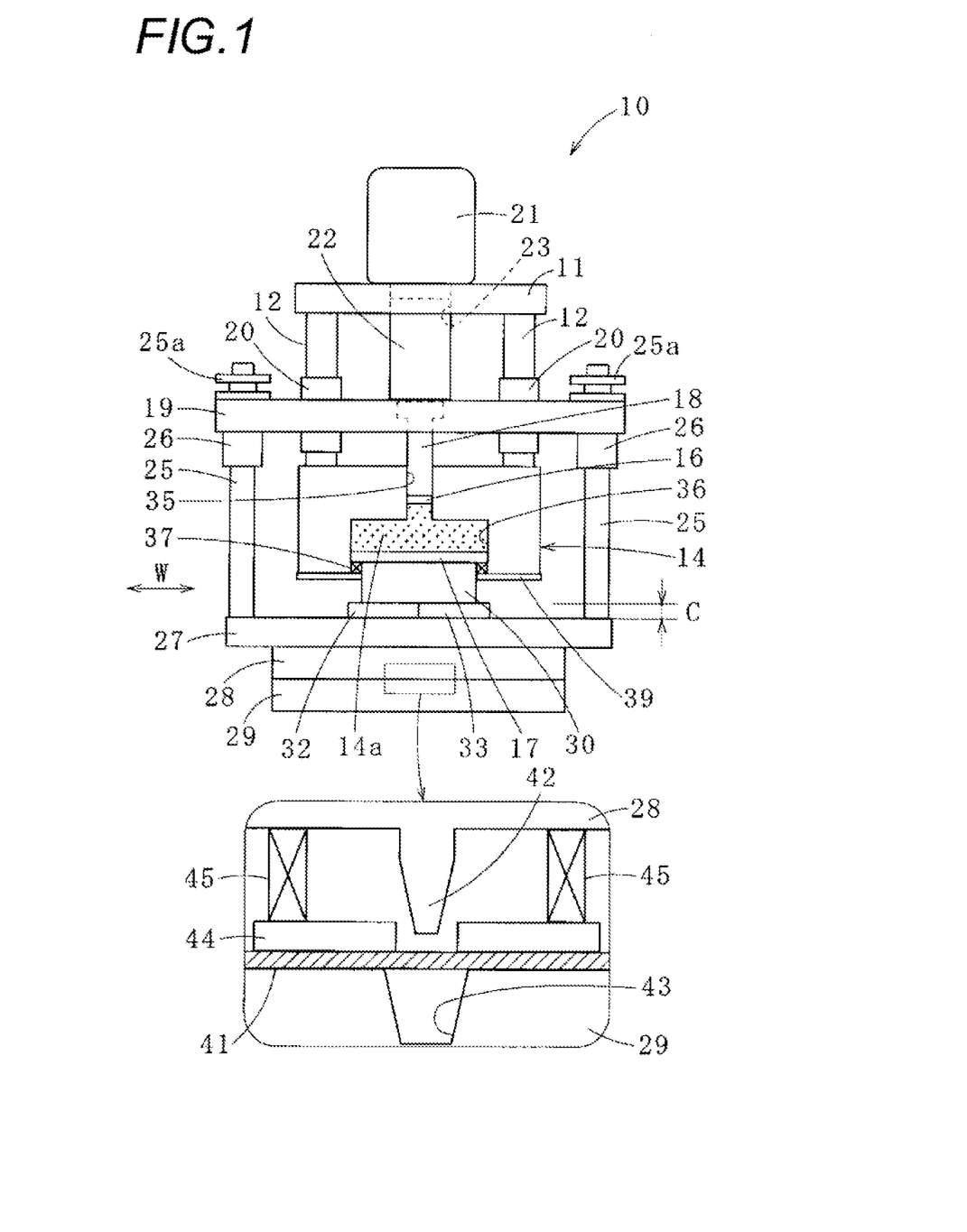
FIG. 1 is a front view of a thin uneven member manufacturing apparatus according to an embodiment of the present invention.

As shown in FIG. 1, a thin uneven member manufacturing apparatus 10 according to the embodiment of the present invention includes a fixed plate-shaped first support member 11 and a cylinder block 14 connected to the first support member 11 through four support rods 12 each having a circular section. Here, the first support member 11 is mounted on a fixed frame (not shown) and does not move vertically.

The cylinder block 14 includes thereon a first piston 16 and a second piston 17 having a diameter larger (for example, 5 to 12 times) than the outside diameter of the first piston 16 while they are successively disposed in series vertically. When the first piston 16 moves down, it pressurizes oil 14a within the cylinder block 14 to increase a pressing force using Pascal's principle to thereby press the second piston 17.

The upper portion of the first piston 16 constitutes a first cylinder rod 18 with its upper end fixed to a plate-shaped second support member 19 wider than the first support member 11. The peripheries of the second support member 19 are slidably mounted on the four support rods 12 through bushes 20, whereby the member 19 can be moved vertically while maintaining its horizontal state.

On the central upper portion of the first support member 11, there is mounted (fixedly disposed) a servo motor 21 serving as a drive source while its output shaft faces downward. To the output shaft, there is connected a ball screw (not shown) with which is threadedly engaged a nut fixed to the interior of a lifting member 22. The lower portion of the lifting member 22 is fixed to the second support member 19, whereas the upper portion is slidably movable vertically within the inner cylinder 23 of the first support member 11. Here, there is constituted a motion converting mechanism which includes the ball screw and nut for converting rotation motion to linear motion; and when the servo motor 21 is rotated, the lifting member 22 and the first piston 16 and second support member 19 respectively connected to the lifting member 22 are raised and lowered. Here, the motion converting mechanism, the first cylinder rod 18, the first piston 16, the second piston 17, the second cylinder rod 30 and the cylinder block 14 constitute a pressure-drive unit which presses a ram 27 using the servo motor 21 as a power source.

Four (multiple) guide posts 25 are slidably disposed in the peripheries of the second support member 19 through bushes 26, with a ram (plate) 27 mounted on the lower ends of the guide posts 25. Here, the lower ends of the guide posts 25 are fixed to the periphery of the ram 27. An upper die 28 is integrally disposed on the bottom of the ram 27, while a lower die 29 opposed to and paired with the upper die 28 is fixedly disposed on a press bed (not shown). The cylinder block 14, the ram 27, the upper die 28 and the lower die 29 are in principle disposed with their axes aligned.

Also, the guide posts 25 include stoppers 25a on their top portions such that the second support member 19 can be fixed to the guide posts 25 at specified positions.

The second cylinder rod 30 fixed direct to the second piston 17 is disposed on the central upper portion of the ram 27 with a clearance C, and when the clearance C is a specified value or larger, horizontally separate and paired first and second slide plates 32 and 33 can be inserted between the second cylinder rod 30 and the ram 27. In an area, which exists on the upper side of the ram 27 and in which the first and second slide plates 32 and 33 slide in the right and left direction, there is provided an air slider (not shown) for blowing out the air upward. Moreover, the first and second slide plates 32 and 33 include air cylinders (not shown) on both sides thereof, thereby enabling the plates to move in the right and left direction (in FIG. 1, shown by W).

On the center of the lower end of the second cylinder rod 30 or on the upper side center of the ram 27, there is provided a positioning stopper contactable by the first and second slide plates 32 and 33, whereby the slide plates 32 and 33 are caused to stop at the width-direction center position (that is, advancement limit) of the ram 27. Here, the first and second slide plates 32 and 33 include in their ends notches into which the positioning stopper can be inserted.

The cylinder block 14 includes a small-diameter cylinder portion 35 for receiving the first piston 16 therein and a large-diameter cylinder portion 36 for receiving the second piston 17 therein. The diameter of the second cylinder rod 30 is smaller than the inside diameter of the large-diameter cylinder portion 36, while the cylinder block 14 has an annular space 37 existing below the second piston 17 and within the large-diameter cylinder portion 36. In the annular space 37, there is disposed a spring (not shown) (an example of an elastic member), and below the large-diameter cylinder portion 36, there is provided an annular plate 39 which supports from below the spring stored within the annular space 37. The second piston 17 is normally energized upward by this spring.

Figure 5:
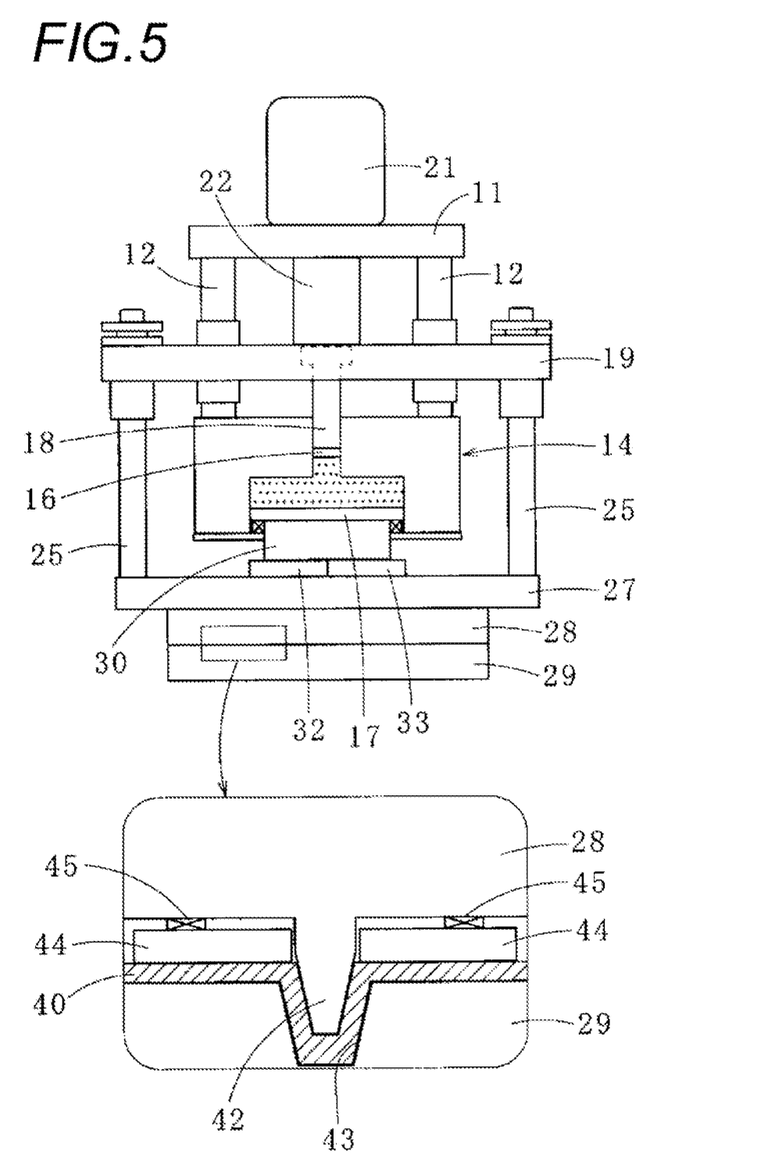
FIG. 5 is an operation explanatory view of the thin uneven member manufacturing apparatus.

As shown enlargedly in FIG. 1, between the upper and lower dies 28 and 29, there is interposed a thin plate 41 to form a thin uneven member 40 (see FIG. 5). The upper die 28 includes a projection 42 projected downward, whereas the lower die 29 includes a recess 43 to be paired with the projection 42.

On the lower portion of the upper die 28, there is provided a stripper plate 44 for pressing the thin plate 41 through a spring 45 which is an example of an elastic member, whereby when the upper die 28 rises after end of press working, the thin uneven member 40, which has become a product, is prevented from rising following the upper die 28.

Next, referring to FIGS. 2 to 5, description is given of the operation of the thin uneven member manufacturing apparatus 10 and a thin uneven member manufacturing method according to the embodiment of the present invention.

Figure 2:
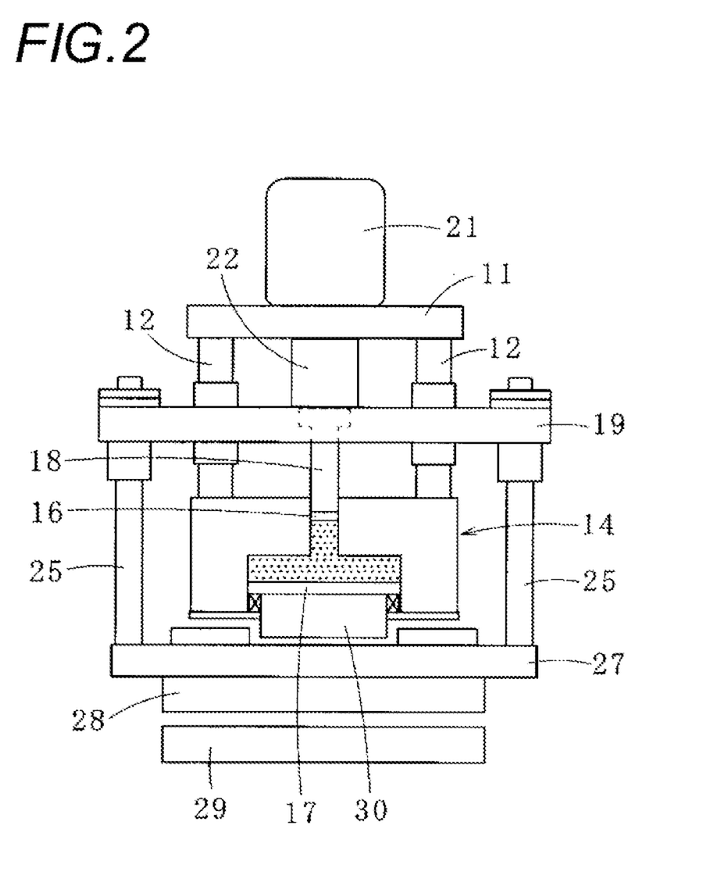
FIG. 2 is an operation explanatory view of the thin uneven member manufacturing apparatus.

As shown in FIG. 2, by rotating the servo motor 21, the lifting member 22 is raised to lift the first and second pistons 16 and 17. This produces a clearance between the second cylinder rod 30 and the ram 27 and also a sufficient clearance between the upper and lower dies 28 and 29. Here, this state provides the top dead center of the ram 27.

Figure 3:
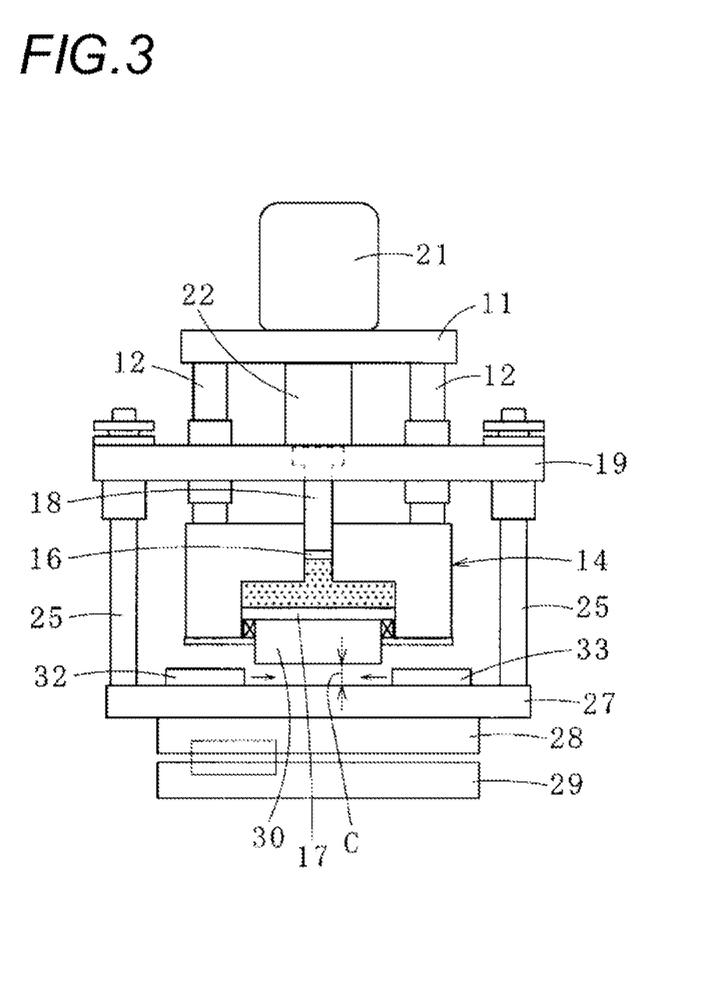
FIG. 3 is an operation explanatory view of the thin uneven member manufacturing apparatus.

Next, as shown in FIG. 3, when the servo motor 21 is rotated to lower the lifting member 22, the second support member 19 descends to thereby lower the ram 27 and the upper die 28 a given distance. In this case, while the first piston 16 also lowers, the lowering amount of the second piston 17 provides S1/S2 (S1 is the section area of the first piston 16, and S2 is the section area of the second piston 17) which is a very small amount, thereby producing a large clearance C between the ram 27 and the second cylinder rod 30.

In this state, the first and second slide plates 32 and 33 are inserted into the clearance C between the second cylinder rod 30 and ram 27. These first and second slide plates 32 and 33 are driven by an air cylinder (not shown) and are arranged in right and left equalized states by a positioning stopper (not shown) provided centrally in the clearance. Here, referring to the clearance C, its upper position can be detected by a distance sensor or a limit switch (neither of which is shown), and in a state where the clearance C exists sufficiently, the first and second slide plates 32 and 33 are to be inserted therein. Here, the first and second slide plates 32 and 33 are used to shorten the moving distance of the second piston 17 (to reduce the lowering time).

Figure 4:
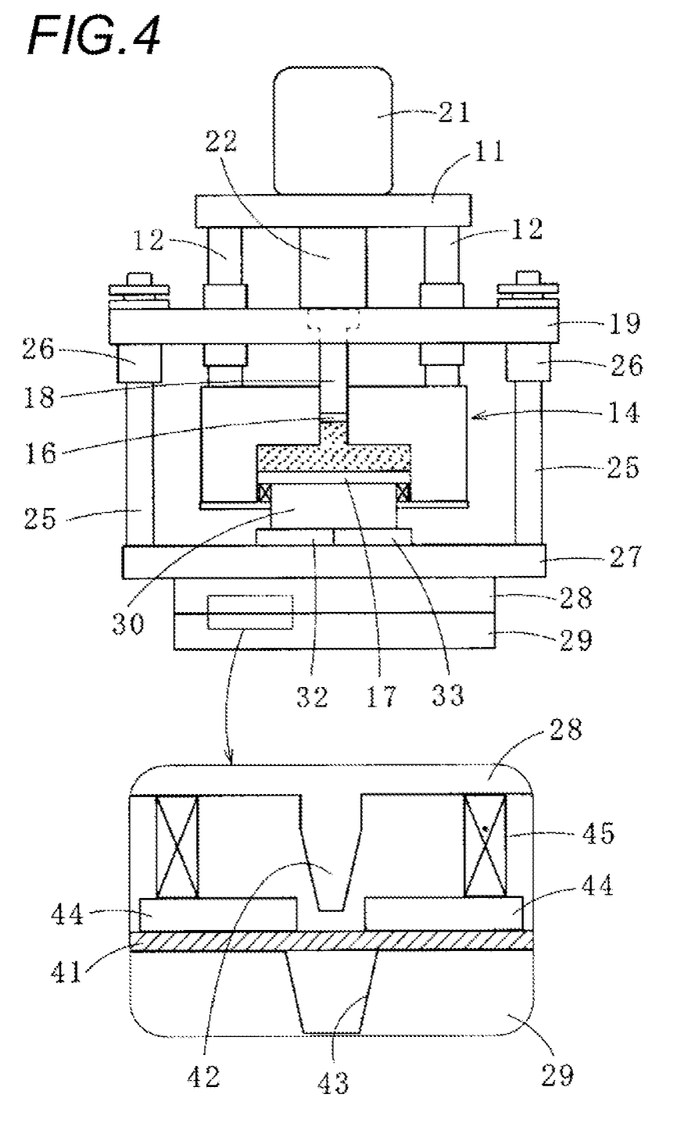
FIG. 4 is an operation explanatory view of the thin uneven member manufacturing apparatus.

FIG. 4 shows a state where the first and second slide plates 32 and 33 are interposed between the second cylinder rod 30 and the ram 27. In this state, when the servo motor 21 is rotated in a given direction, the lifting member 22 lowers further to lower the second support member 19 and also the first piston 16. In this case, since the bushes 26 are provided in the peripheries of the second support member 19, continuous lowering is possible. When the first piston 16 descends, the second piston 17 descends according to Pascal's principle, thereby increasing its pressing force up to S2/S1. Thus, a load is applied to the ram 27. Here, before the bottom dead center of the ram 27 and before the cylinder rod 30 applies a load to the ram 27, the upper die 28 is supported to be stationary by the spring 45 of the stripper plate 44 having an elastic force larger than the dead weights of the ram 27, the first and second slide plates 32 and 33, and the guide post 25.

Figure 6A:
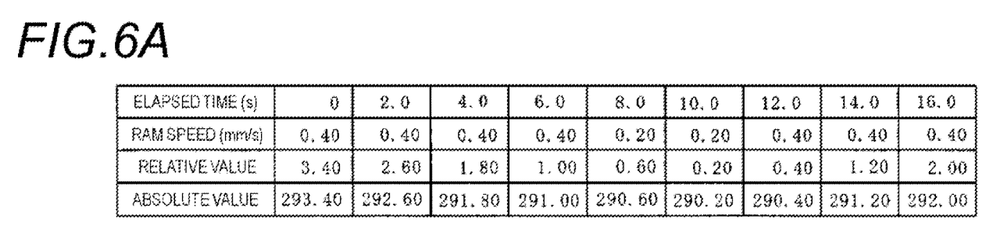
FIG. 6A is a table showing the elapsed time of a ram to its bottom dead center and the speed thereof.
Figure 6B:
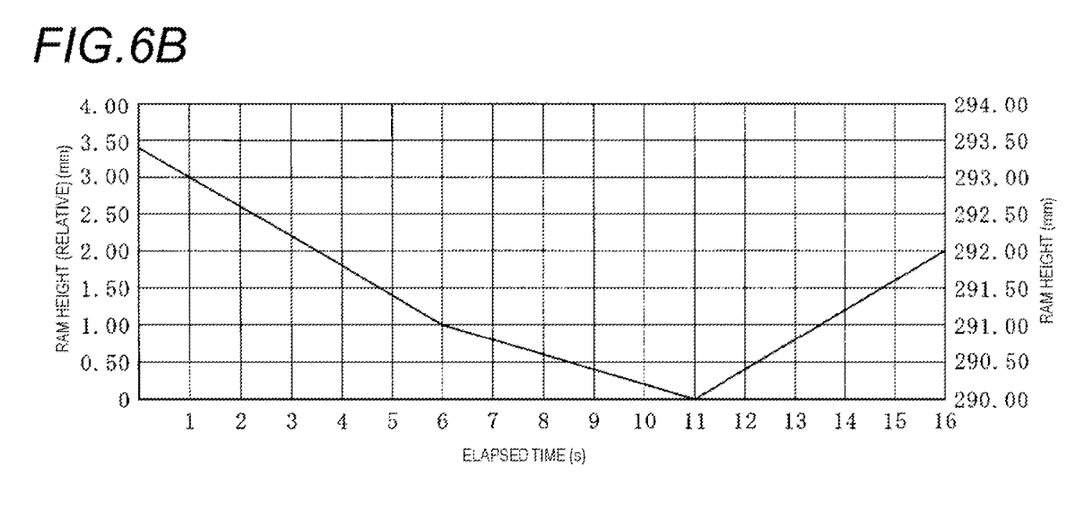
FIG. 6B is a graph in which respective values of FIG. 6A are plotted.

Next, FIG. 5 shows a state where the second cylinder rod 30 applies a load to the ram 27 and forming work (uneven-shape forming work) on the thin plate 41 is started, wherein the projection 42 of the upper die 28 is partially engaged into the recess 43 of the lower die 29 to thereby form the thin uneven member 40. Here, the bottom dead center of the ram 27 may be measured by a limit switch or a distance sensor, or by detecting the pressure of the oil 14a within the cylinder block 14. This state is shown in FIGS. 6A and 6B. After eleven seconds from the start, the ram 27 reaches the bottom dead center, thereby completing the working. Thus, by reducing the forming speed around the bottom dead center of the ram 27, the precision of the working can be enhanced further.

Next, when the servo motor 21 is reversed, the upper die 28 rises but the thin uneven member 40 is prevented from rising following the projection 42 because it is held by the stripper plate 44. After a sufficient clearance is secured between the upper and lower dies 28 and 29, the thin uneven member 40 is removed, thereby ending one working step.

Next, description is given of a method for manufacturing a fuel cell separator 47 (see FIG. 9B), an example of a thin uneven member, using the thin uneven member manufacturing apparatus 10 in part of working steps.

As shown in FIGS. 7A to 9C, a thin plate 48 for forming the fuel cell separator 47 is a plate made of stainless steel, titanium or the like having a thickness of, for example, about 0.3 to 0.7 mm and a width sufficiently larger than the longitudinal width of the fuel cell separator 47.

Figure 7A:
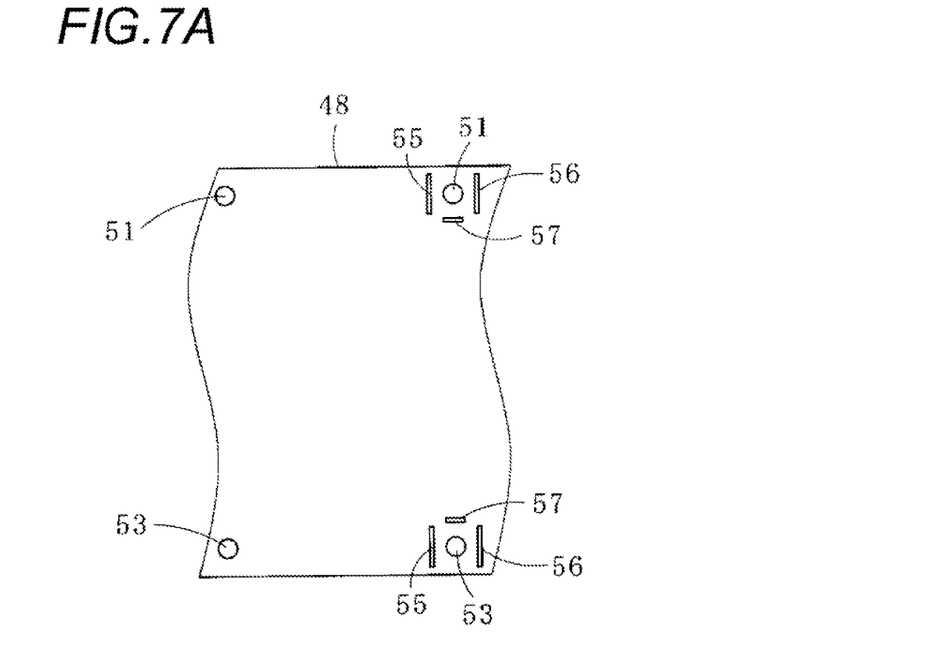
FIG. 7A is an explanatory view of a method for manufacturing a fuel cell separator using the thin uneven member manufacturing apparatus in part.
Figure 7B:
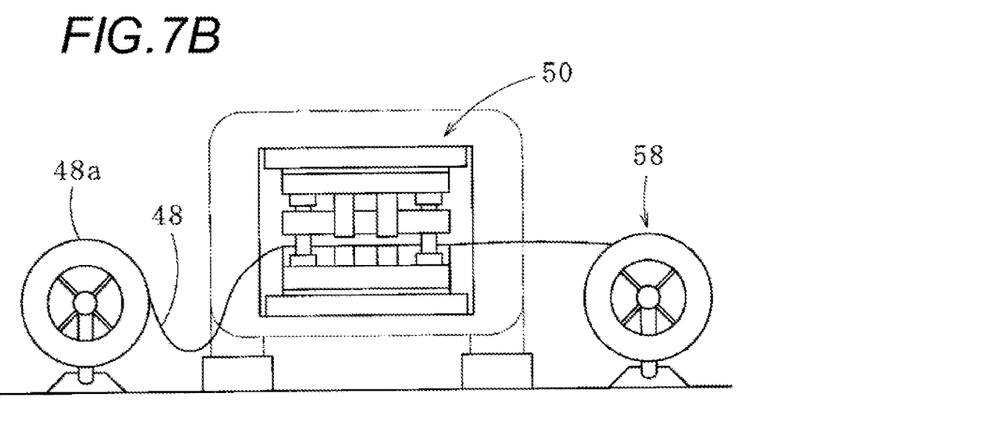
FIG. 7B is a side view of a first die apparatus for enforcing the method.

As shown in FIGS. 7A and 7B, in the thin plate 48 gradually unwound from a reel unwinding device 48a, there are formed two pilot holes (circular holes) 51 and 53 at a given pitch by a first die apparatus 50 (pilot hole forming step). Here, the given pitch is formed wider (for example, 1.1 to 1.3 times) than the transverse width of the fuel cell separator 47. Then, in the first die apparatus 50, as the thin plate 48 is sequentially fed, slits 55 to 57 are formed around the pilot holes 51 and 53 formed on both sides of the thin plate 48 in the longitudinal width direction. The slits 55, 56 and 57 are linear in shape.

Such formation of the slits 55 to 57 can prevent the pilot holes 55 and 56 against distortion or deformation when the other portions of the thin plate 48 are pressed in the following steps.

Here, as the first die apparatus 50, there can be applied a normal press apparatus having a crank mechanism and a normal press apparatus of a hydraulically driven type or a servo motor driven type. The thin plate 48 worked by the first die apparatus 50 is reel-wound by a winding apparatus 58.

Figure 8A:
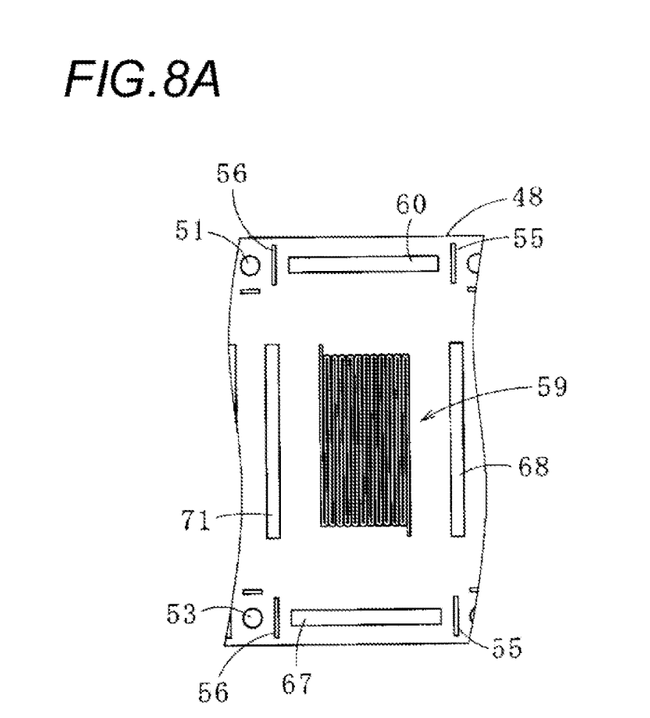
FIG. 8A is an explanatory view of a method for manufacturing a fuel cell separator using the thin uneven member manufacturing apparatus in part.
Figure 8B:
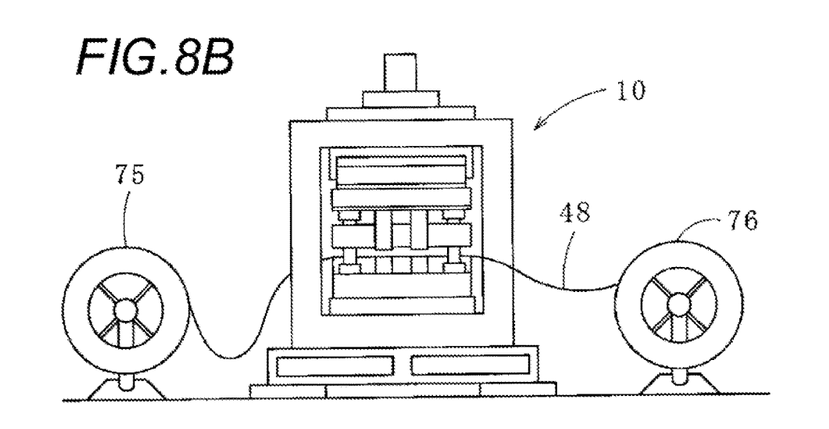
FIG. 8B is a side view of a second die apparatus for enforcing the method.

Next, as shown in FIGS. 8A and 8B, using a thin uneven member manufacturing apparatus (second die apparatus) 10, with the pilot holes 51 and 53 as reference, the thin plate 48 is subjected to unevenness working to simultaneously form a flow passage groove 59 (for details, see FIG. 9C) in its central portion, reinforcing ribs 60 and 67 constituted of dummy grooves on its upper and lower sides (both sides in the longitudinal width direction), and reinforcing ribs 68 and 71 constituted of dummy grooves on its right and left sides (both sides in the transverse width direction). In this case, since the flow passage groove 59 and dummy grooves (reinforcing ribs 60, 67, 68, 71) are unevenness worked simultaneously, the dummy groove working prevents the thin plate 48 from being stretched toward centrally in the flow passage groove working. Further, formation of the reinforcing ribs 60 and 67 on both sides in the longitudinal width direction enables the thin plate 48 to have rigidity, thereby facilitating the supply and feed of the material in a third die apparatus 78. Here, FIG. 8B indicates an apparatus 75 for unwinding the thin plate 48, and an apparatus 76 for winding the thin plate 48.

Figures 9A, 9B, 9C:
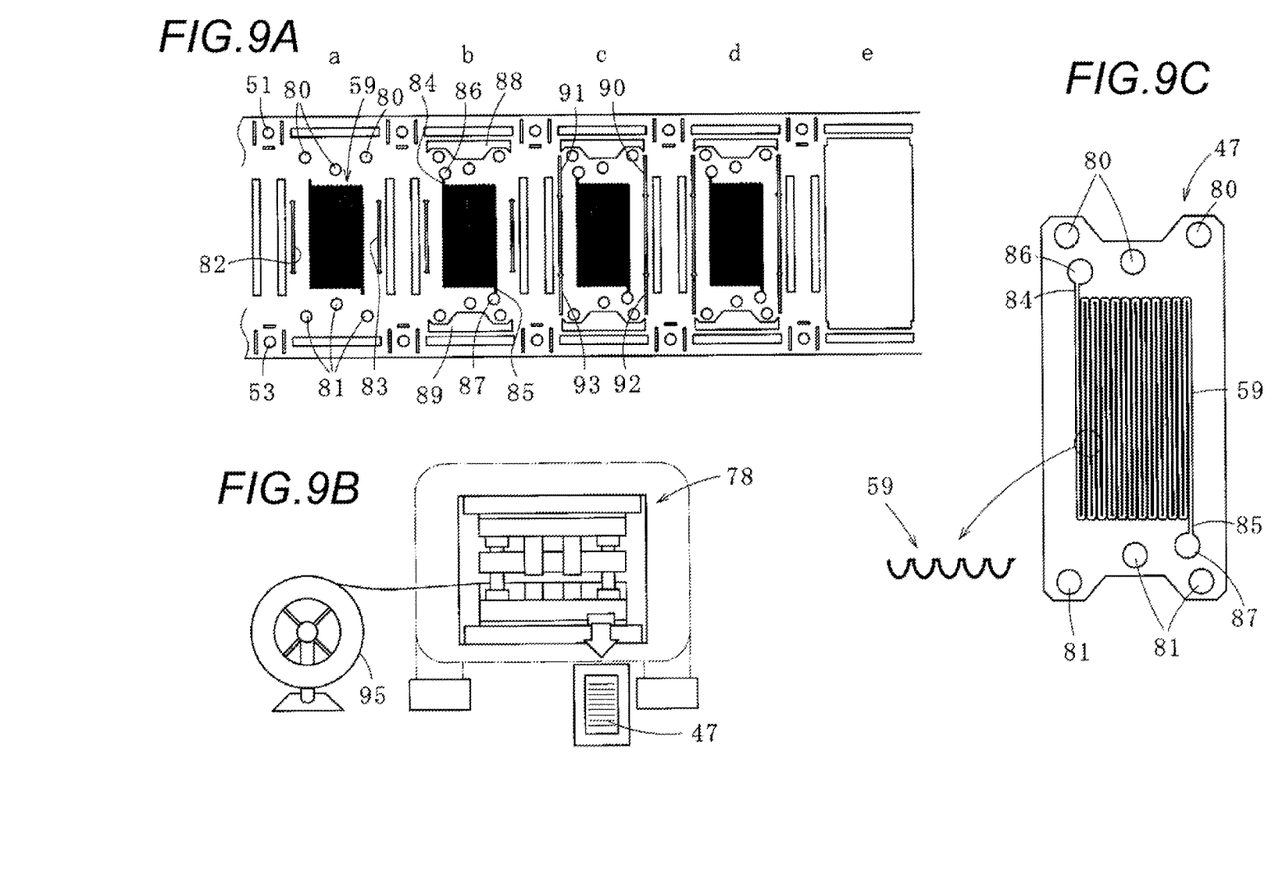
FIG. 9A is an explanatory view of a method for manufacturing a fuel cell separator using the thin uneven member manufacturing apparatus in part.
FIG. 9B is a side view of a third die apparatus for enforcing the method.
FIG. 9C is a plan view of a fuel cell separator.

Next, as shown in FIGS. 9A to 9C, using the third die apparatus 78 including stations a to e, the thin plate is subjected to slot (partial punching) punching around the flow passage groove 59 to form the contour of the fuel cell separator 47. That is, in the station a, penetration holes 80, 81 (three per each) for separator lamination are punch-formed on the upper and lower sides (both sides in the longitudinal direction) of the flow passage groove 59, and first and second slots (elongated holes) 82 and 83 are punch-formed on both sides in the width direction. Here, the third die apparatus 78, similarly to the first die apparatus 50, is constituted of a normal press apparatus.

In the station b, hydrogen or oxygen supply holes 86 and 87 to be connected to extension grooves 84 and 85 formed in the ends of the flow passage groove 59 are punch-formed, and simultaneously, third and fourth slots (bland) 88 and 89 for forming the upper and lower contours of the fuel cell separator 47 are punch-formed.

In the station c, upward and downward of the first and second slots 82 and 83, there are punch-formed fifth to seventh slots (elongated slots) 90 to 93. The station d is an idle station where no punching is enforced.

In the station e, the connecting portions (that is, the remaining portions of the contour which are used to form the contour of the fuel cell separator 47) of the third and fourth slots 88, 89 and fifth to seventh slots 90 to 93 are punched off to form the fuel cell separator 47 shown in FIG. 9C. FIG. 9B shows the third die apparatus 78 including the stations a to e, wherein the thin plate 48 is supplied from an unwinding apparatus 95. The remaining materials discharged from the third die apparatus 78 are treated as scrap. Since the separator contour is formed in this manner stress remaining in the flow passage groove working can be released gradually, thereby preventing the separator against deformation.

Here, in the third die apparatus 78, the sequence of the punching operations within the respective stations a to c can be changed.

In the method for manufacturing the fuel cell separator 47 according to the embodiment, use of the first to third die apparatuses 50, 10 and 78 enables the optimum setting of the operation hours of the respective die apparatuses 50, 10 and 78 and thus, as a whole, the fuel cell separator 47 can be manufactured within the minimum time. In this fuel cell separator manufacturing method, a further small-scaled press can also be used, and when the design of the flow passage groove of the separator is changed, such design change can be dealt by changing only the die within the second die apparatus.

Also, the thin plate 48 to be supplied to the first to third die apparatuses 50, 10 and 78 is supplied from the unwinding apparatus and is wound by the winding apparatus from the first and second die apparatuses 50 and 10. Thus, the operation time of the respective die apparatuses 50, 10 and 78 can be also changed.

The present invention is not limited to the above embodiment but the structure thereof can be changed without departing from the gist of the present invention. For example, as shown in FIGS. 6A and 6B, the working speed is not limited to the two-stage control but it may also be controlled in three or more stages; and after the ram is lifted before the bottom dead center, the ram may also be lowered down to the bottom dead center for working.

What is claimed is:

1. A method for manufacturing a thin uneven member by using a servo motor as a drive source, driving a second piston with an increased output of a first piston using Pascal's principle, and pressing a thin plate interposed between upper and lower dies with an aid of a ram lifted and lowered by the second piston, the method comprising:
    a first step of driving the servo motor to lower the ram relative to the second piston to thereby form a clearance between the ram and a second cylinder rod of the second piston; and
    a second step of operating the second piston in linking with the first piston to perform unevenness working on the thin plate.

2. The method according to claim 1, wherein the second step includes disposing paired first and second slide plates in the clearance between the ram and the second cylinder rod to thereby reduce a lowering time of the second piston.

3. The method according to claim 1, wherein the first and second pistons are successively disposed in series vertically within a cylinder block.

4. The method according to claim 1, wherein the thin uneven member is a fuel cell separator, and the second step includes performing unevenness working on the thin plate to thereby form a flow passage groove in the fuel cell separator.

5. The method according to claim 4, wherein the second step includes performing unevenness working on the thin plate simultaneously with the unevenness working for the flow passage groove to form dummy grooves around the flow passage groove.

6. The method according to claim 4, further comprising a step of forming a pilot hole using a first die apparatus before the second step, and after the second step, a punching step be performed by a third die apparatus.

7. The method according to claim 6, wherein a slit is formed around the pilot hole in the pilot hole forming step.

8. The method according to claim 6, wherein a contour of the thin uneven member is partially punched off to cut the remainders of the contour, thereby punching off the thin uneven member from the third die apparatus.

9. The method according to claim 1, wherein the first step includes driving the servo motor to lower the ram at a first speed and the second piston at a second speed different from the first speed.

10. The method according to claim 9, wherein the first speed is greater than the second speed.

11. The method according to claim 1, wherein the clearance between the ram and the second cylinder rod is increased as the ram is lowered relative to the second piston.

12. The method according to claim 2, wherein the paired first and second slide plates slide on an upper side of the ram in right and left directions to insert the paired first and second slide plates in the clearance between the ram and the second cylinder rod.

13. The method according to claim 12, wherein the paired first and second slide plates stay on the upper side of the ram respectively at right and left sides of the second cylinder rod before the first step.

* * * * *